United States Patent

Barton et al.

Patent Number: 5,565,116
Date of Patent: Oct. 15, 1996

[54] STUD WELDING

[75] Inventors: David D. Barton, P.O. Box 782, Bellaire, Tex. 77402; Robert B. Schlenk, Louisville, Ky.

[73] Assignee: David D. Barton, Bellaire, Tex.

[21] Appl. No.: 373,984

[22] Filed: Jan. 18, 1995

[51] Int. Cl.$^6$ .................................................. B23K 9/20
[52] U.S. Cl. .................................................. 219/98
[58] Field of Search ............................ 219/98, 99, 95, 219/96, 113; 336/136, 223

[56] References Cited

U.S. PATENT DOCUMENTS

| | | |
|---|---|---|
| 1,368,287 | 2/1921 | Pennington . |
| 2,122,557 | 7/1938 | Canter . |
| 2,337,294 | 12/1943 | Cooper ........................................ 219/96 |
| 2,402,659 | 6/1946 | Nelson ........................................ 219/98 |
| 2,543,479 | 2/1951 | Toman ........................................ 336/136 |
| 2,666,187 | 1/1954 | Ketcham ........................................ 336/136 |
| 2,708,129 | 5/1955 | Kelemen et al. ........................................ 219/98 |
| 2,760,797 | 8/1956 | Woodling ........................................ 219/98 |
| 2,993,982 | 7/1961 | Glover ........................................ 219/99 |
| 3,551,786 | 12/1970 | Van Gulik ........................................ 219/113 |
| 3,564,191 | 2/1971 | Elzer et al. ........................................ 219/95 |
| 4,449,092 | 5/1984 | Kondo ........................................ 219/98 |
| 4,539,767 | 9/1985 | Jaffe . |
| 4,884,778 | 12/1989 | Yamamoto . |
| 4,893,532 | 1/1990 | Walburn et al. . |
| 4,932,626 | 6/1990 | Guillot . |
| 5,214,886 | 6/1993 | Hugron . |

FOREIGN PATENT DOCUMENTS

| | | | |
|---|---|---|---|
| 4222664 | 1/1994 | Germany ........................................ 219/98 |
| 2065011 | 6/1981 | United Kingdom ........................................ 219/98 |

*Primary Examiner*—Clifford C. Shaw
*Attorney, Agent, or Firm*—Pravel, Hewitt, Kimball & Krieger

[57] ABSTRACT

A capacitive stud welding having an inductive-capacitive welding current supply circuit is provided with a stud and a tunable inductor. The stud is attachable to a workpiece and has an end portion shaped to retain in place on the workpiece at the weld point the flux from the stud to form an optimum weld. The tunable electrical inductor optimizes resonance of the inductive-capacitive welding current supply circuit and the flow of welding current through the stud and workpiece.

21 Claims, 3 Drawing Sheets

STUD WELDING

BACKGROUND OF INVENTION

1. Field of Invention

The present invention relates to stud welding.

2. Description of Prior Art

It has been common practice to attach labels or other information bearing tags to steel bars or other metallic product bundles or objects before their shipment. So far as is known, these studs have been typically welded by using a capacitive stud welding technique. There have been considerable problems with the studs being broken or knocked off when contacted by other objects. This in turn caused costly reidentification procedures. The strength of the weld between the stud and the object or workpiece has, within applicants' knowledge, been unsatisfactory.

SUMMARY OF INVENTION

Briefly, the present invention provides a new and improved capacitive stud welding system having an inductive-capacitive welding current supply circuit. The welding system has a new and improved stud for attachment by the system to the workpiece and a tunable inductor for optimizing resonance of the inductive-capacitive welding current supply circuit and current flow through the stud and the workpiece.

The stud is used to attach a label or other component to the workpiece and includes a connector head at one end for fitting into a welding gun of the system. The stud also includes a collar formed along an intermediate portion of the stud for fitting the stud into the gun and also for retaining the label or other component on the workpiece when the stud is attached. The stud also includes an outwardly extending skirt formed at an opposite end opposite the connector head. The skirt forms an interior recess defining an extended, yet sheltered arc length for flow of applied welding current to the work piece. The interior recess also retains molten material from the heated stud in place against the workpiece during welding. Additionally, the skirt functions to provide a larger surface area over which an arc can be formed than the prior tip or point on conventional studs. The larger surface area thus permits longer weld time and a better arc when the workpiece has a rough or irregular surface.

The tunable inductor of the welding system according to the present invention optimizes resonance of the inductive-capacitive welding current supply circuit and flow of heating current through the stud and the workpiece. The tunable inductor includes a sheet of electrically conductive material wound into a cylindrical shape and having a longitudinal passage formed through it. A ferromagnetic core is movable within the longitudinal passage of the sheet to vary the inductance of the coil and thus the resonance of the welding current supply circuit.

The welding system according to the present invention thus provides a tunable electrical inductor/controller to control the current flow in the stud welding system. The welding system according to the present invention also provides a new and improved welding stud which co-acts with the controller for improved welding results on irregular or rough surfaces.

DESCRIPTION OF PREFERRED EMBODIMENT

Figure 1:
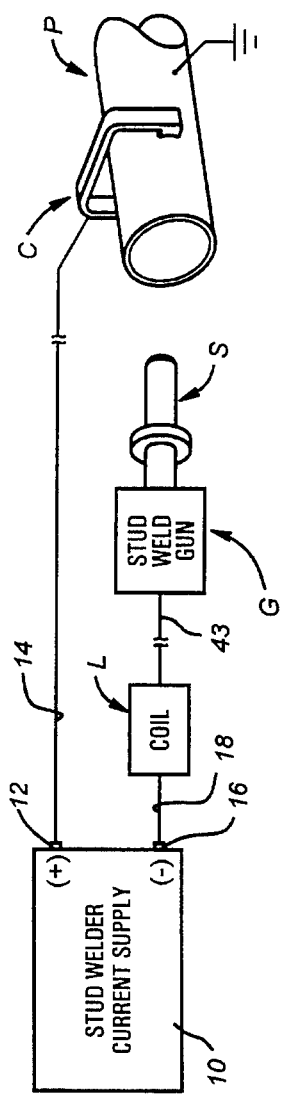
FIG. 1 is a schematic diagram of a stud welding system according to the present invention.
Figure 2:
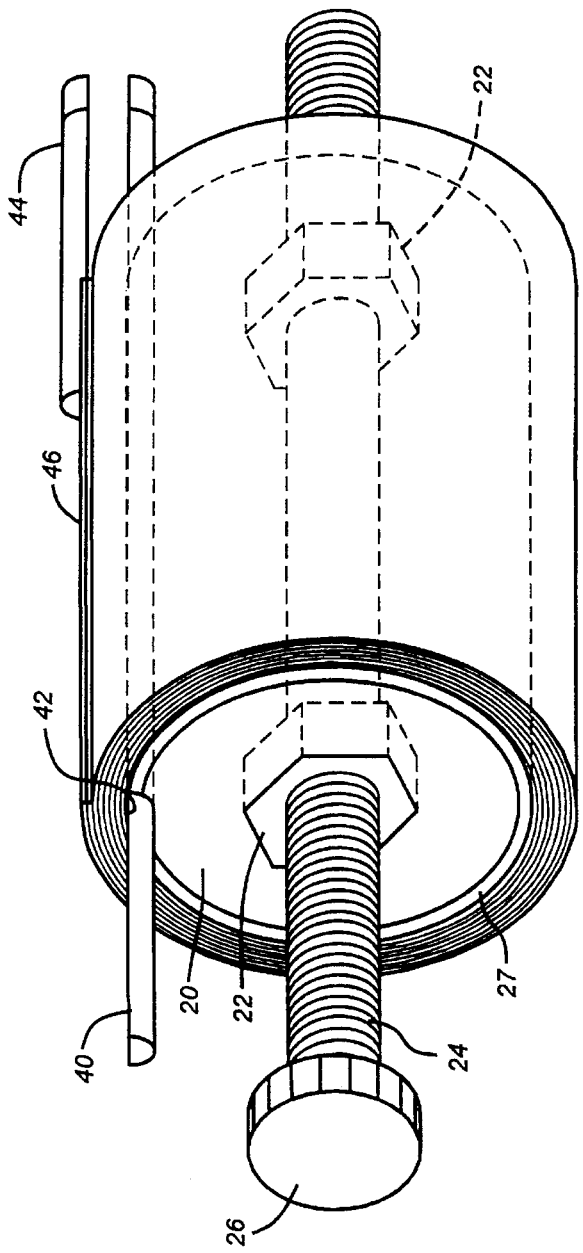
FIG. 2 is an isometric view of a tunable inductor of the present invention in the stud welding system of FIG. 1.
Figure 3:
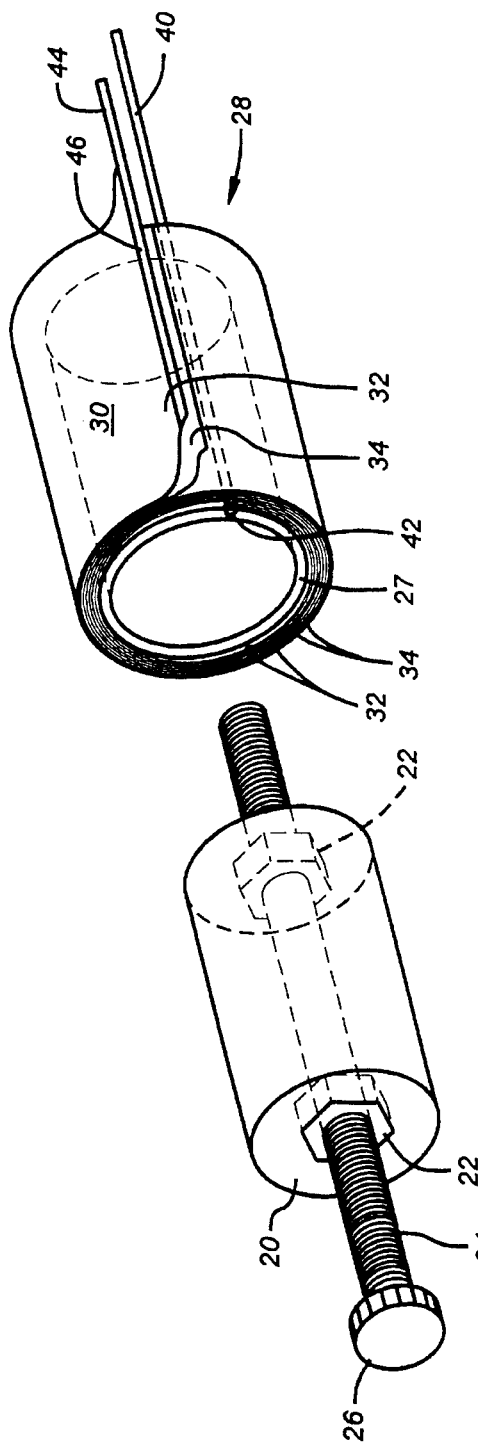
FIG. 3 is another isometric view, partly exploded, of the inductor of FIGS. 1 and 2.
Figure 4:
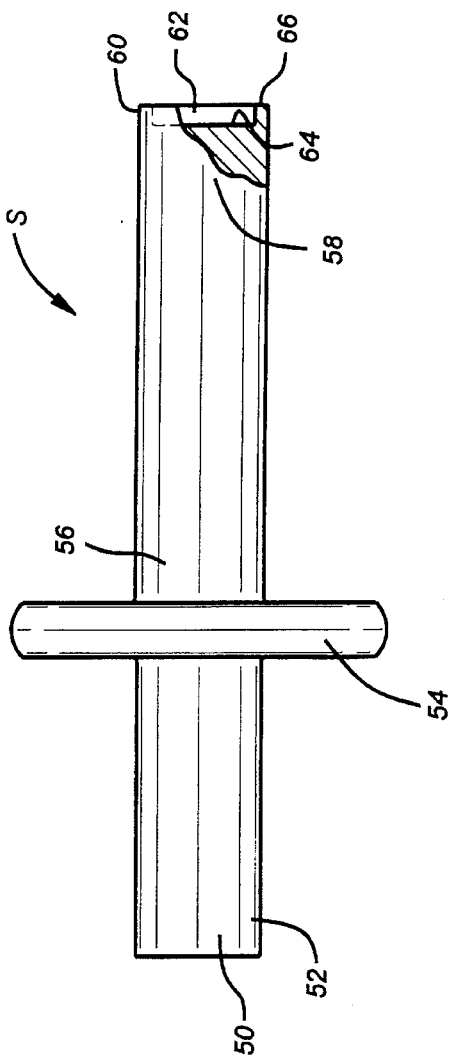
FIG. 4 is an elevation view, partly broken away, of a welding stud of the present invention used in the stud welding system of FIG. 1.
Figure 5:
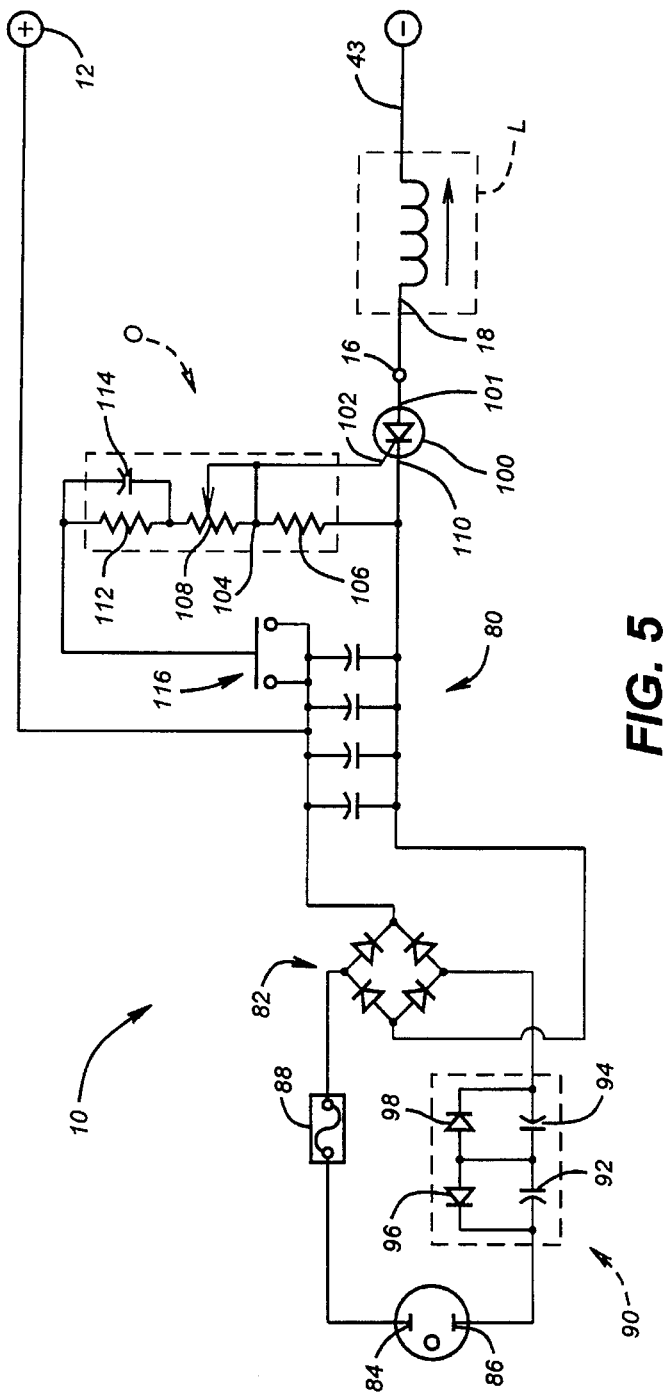
FIG. 5 is a schematic electrical circuit diagram of the current supply circuit for the stud welding system of FIG. 1.

In the drawings, the letter W designates a new and improved stud welding system according to the present invention. The stud welding system W is used to weld a stud S (FIGS. 1 and 4) to a workpiece P. The stud welding system W is of the capacitive type having an inductive-capacitive current supply circuit 10 connected through a tunable inductor or coil L (FIGS. 1–3) to a stud welding gun G in which the stud S is mounted. The current supply circuit 10 (FIGS. 1 and 5) is connected at a first positive, or +, output terminal 12 by a conductor 14 and clamp C to the workpiece P. The current supply circuit 10 is connected at a negative opposite, or −, output terminal 16 by a conductor 18 to the tunable inductor L.

The inductive-capacitive current supply or driving circuit 10 (FIG. 5) includes a chargeable bank of capacitors which, as will be set forth, is controllably discharged through a suitable semiconductor switching device (usually a silicon-controlled rectifier or SCR) into an electrical load, in this case the welding stud S.

In prior art stud welder driving circuits, the capacitance of the capacitors has been a fixed value, while the electrical properties of the load such as welding leads and varying grounds usually varied based on the particular welding operation conditions during the welding operation. Thus, it has been found that the flow of electrical power through these leads and grounds to the welding stud load was not satisfactorily balanced. For example, the switching through SCR's into a stud welding load produced a high level of harmonic currents, due to the abrupt switching and discontinuous waveforms and an abrupt power surge would occur.

With the present invention, it has been found that the supply circuit 10 and the tunable inductor L operating in conjunction overcome the abrupt and unsatisfactory power flow problems, smoothing the power surges. The inductor L has bi-directional power flow properties that permit it to solve this problem whether the load is a welding stud or an electrical power source. The supply circuit 10, as will be set forth, provides an initial arc current of high level.

The inductor L according to the present invention (FIGS. 2–3) has a ferromagnetic core 20 in the form of an elongated toroid or plug of silicone steel. The core has fitted within it a threaded inner member such as spaced nuts 22 or a threaded inner surface or sleeve. The threaded members 22 are fitted onto a rotatably movable threaded rod 24. The rotatable rod 24 is driven by motor or hand through an adjustment or control knob 26 to advance or retract the core 20 along length of the rod 24. As the rod 24 is rotated, the ferromagnetic core 20 moves along the longitudinal axis of threaded members 22 and the rod 24. The direction of movement of core 20 is governed by the rotational movement of the rod 24.

The core 20 is within a tube or sleeve 27 of a suitable resin such as a plexiglas. The tube 27 serves as an inner sleeve or roller onto which an inductive coil 28 is wound. The coil 28 is in the form of a sheet 30 of electrically conductive material wound in a cylindrical spiral roll of adjacent layers 32 about the tube 27. For electrical insulation purposes, an insulative laminate sheet 34 is mounted between successive ones of the spiral layers 32 of the spirally wound reel or sheet 30 of conductive material.

The insulative material 34 is formed of a suitable pliable, relatively thin but insulative synthetic resin. A suitable such material is that sold under the trade name Mylar, having an example thickness of about 0.010", or ten thousandths of an inch or so.

The conductive material in the sheet 30 may be any suitable electrically conductive material such as copper, aluminum, silver or the like. Alloys of these and other electrically conductive materials may also be used, if desired.

In the preferred embodiment, the sheet 30 of conductive material in the coil 28 is a sheet of copper wound into twelve or so spirally wound layers 34 spaced from each other by the insulative material layer 32. The conductive copper sheet 30 is from about ten to twenty, such as approximately fifteen, feet in length. The sheet 30 is from about four to eight, typically approximately six, inches in width along the rod 24. The sheet 30 is usually between ten- and twenty-thousandths of an inch thick, in the preferred embodiment about 0.016" in thickness.

With the present invention, it has been found that a spirally wound sheet of conductive metal, such as copper, foil functions better as an inductor coil than wound wire coils. The conductive metal foil sheet exhibits practically no loss due to resistance. In contrast, round wire in coils on passage of current through them begin to heat up due to what is known as the skin effect, increasing the resistance. Such increased wire resistance causes a reduction in welding current.

The coil 28 is electrically connected into conductor 18 of the stud welding system W by a first electrical connector 40 mounted along an inner end 42 of the sheet 30 of conductive material. The coil 28 is also electrically connected into conductor 43 (FIG. 1) and the welding gun G of the stud welding system W by a second electrical connector 44 (FIGS. 2 & 3) mounted along an outer end 46 of the sheet 30 of conductive material.

As the toroidal core 20 moves along the rod 24 within the coil 28, the magnetic permeability and thus the inductance of the inductor L changes. Since the inductor L is connected in series with the capacitive welding current supply circuit, the resonant frequency or resonance of this inductive-capacitive (or L-C) circuit can be changed. This in turn varies the amount of welding supply current flowing into the stud S, without any variation in the resistive load of the stud S and the workpiece P. Thus, with the present invention, the inductance of the inductor can be tuned or adjusted to vary the amount of welding supply current flowing to the load of the stud S and the workpiece P as required during stud welding operations.

This permits more equal distribution of heat between the workpiece P and the stud S. It also allows for the workpiece P to be more effectively heated up, so that the workpiece P is more receptive to welding.

The stud S (FIGS. 1 and 4) of the welding system W of the present invention is generally cylindrical and formed of any conventional welding stud material. The dimensions of the stud S also may vary based on intended end use. In one embodiment, the stud S is one inch or so in length.

The stud S is adapted to be fitted at a connector head 50, such as a chuck or collet, in a connector end 52 into the stud welding gun G. The stud S extends from the connector end 52 to a laterally extending collar or ring 54 formed along an intermediate portion 56. The collar 54 is adapted to function as a stop or stay when the stud S is inserted into the gun G. The collar 54 also retains a component to be attached, such as a label or tag T, in place on the stud S adjacent the workpiece P once stud welding is completed. Usually, the diameter of the collar 54 is forty or fifty percent of the length of the stud S.

It should be understood that the label or tag T is only an example component which is attachable by the stud S. Other types of components such as attachment structure for insulation and fireproof materials for furnaces and high temperature equipment may also be attached.

The stud S extends from the intermediate portion 56 to a work or lower end 58 opposite the gun end 52. A skirt 60 is formed extending longitudinally outwardly from the lower end 58 of the stud S, forming an interior recess 62 adjacent an interior end wall or surface 64. For a one inch stud, a skirt of twenty five mils or so in length and wall thickness is suitable. The interior end surface 64 may be a substantially flat surface, as shown, or may be an inwardly curved or hemispherical surface.

The skirt 60 is integrally formed with the stud S, having an outer diameter equal to that of the intermediate portion 56 and gun head 52. For a stud S which is about one inch long, an outer diameter of approximately one-sixth inch or so is usually suitable.

Figure 4B:
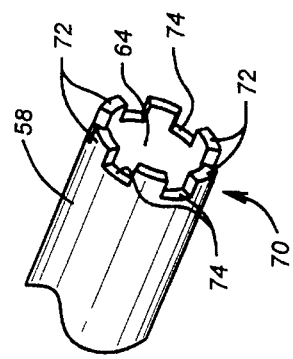
FIGS. 4A and 4B are isometric views of alternative end skirts for the welding stud of FIG. 4.
Figure 4A:
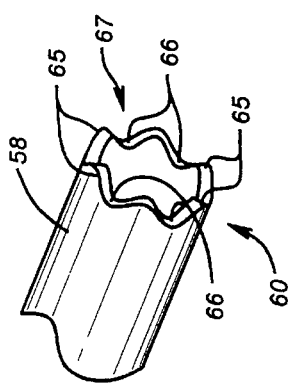

The skirt 60 may take any of several forms. In a simplest form, the skirt 60 has a substantially flat end surface 66 for initial contact with the workpiece P. However, with the present invention, it has been found that other forms of end surfaces for the skirt 60 may offer added efficiencies in stud welding. For example, an undulating or rippled end surface 65 (FIG. 4A) of alternating crests 65 and troughs 66 for an alternate end portion 67 on the skirt 60 of a generally sinusoidal configuration has been found to be suitable. Alternatively, a notched or indented end surface 70 (FIG. 4B) for the skirt 60 of alternating toothlike members 72 and gaps 74 may also be used. Other toothed surfaces may also be used.

The skirt 60 of the welding stud S according to the present invention performs several functions. First, the skirt 60 provides an initial contact or pressure point for the stud S on the workpiece P. Depending on the particular stud welding operations, the stud S may be selected according to the most suitable type of end surface needed. The skirt 60 also provides a larger surface area over which an arc can be formed than the prior conventional tip or point. This permits longer weld time and better arc formation, particularly on rough or irregular workpiece surfaces. Further, the reduced wall thickness of the skirt 60 affords a relatively high resistivity path for the welding current which causes vaporization of the skirt material, and thus initiating the arc. This more rapidly produces a melting point in the stud S at the workpiece P. The recess 62 also defines an extended, yet sheltered arc length within the skirt 60 for flow of applied welding current to the workpiece P. The stud S and its recess 62 also form a pocket for accumulation of molten flux on the workpiece P, providing adequate molten stud material for a strong and reliable weld. The skirt also standardizes arc lengths on rough or ground workpiece surfaces.

Considering the welding supply circuit 10 (FIG. 5) more in detail, a bank of parallel connected capacitors 80 is charged with direct current provided from a rectifier bridge circuit 82. The bridge circuit 82 receives operating alternating current electrical power from terminals 84 and 86 which are connected to any suitable source of alternating current electrical power. A protective fuse 88 is connected between the terminal 84 and the bridge 82.

A low-voltage, transformerless power supply circuit 90 is also connected in supply circuit 10, usually between the input terminal 86 and the bridge 82. The voltage supply 90 includes a pair of capacitors 92 and 94 connected in series with each other between the terminal 86 and the bridge 82. A rectifier or diode 96 is connected in parallel with the capacitor 92, while a diode 98 of reverse polarity to the diode 96 is connected in parallel with a capacitor 94 and in series with the diode 96. The series connected capacitors 92 and 94 in effect perform the function of and replace a conventional iron core transformer. The voltage supply 90 provides a much more efficient transfer of energy from the alternating current source at terminals 84 and 86 to the bridge 82 in place of a ferro magnetic, step-down transformer.

When a first of the capacitors, such as capacitor 92, is charged through the diode 98 during a first half-cycle of alternating current the alternate capacitor 94 is discharging current into the bridge 82. The capacitance of the capacitors 92 and 94 is selected based on the output voltage to be provided to the bridge 82. For example, for a 120 volt alternating current power level being present at terminals 84 and 86, capacitors 92 and 94 with a capacitance of 252 microfarads provide an output voltage of 12 volts alternating current. Of course, other capacitance value for the capacitors 92 and 94 may be chosen based upon particular operating conditions for the supply circuit 10.

A semiconductor switch 100, preferably a silicone-controlled rectifier (or SCR) in the supply circuit 10 is electrically connected at an anode terminal 101 to the inductor coil L at terminal 16 by the conductor 18. A gate terminal 102 of the semiconductor switch 100 is connected to a terminal or connection 104 between a fixed resistor 106 and a variable resistor or potentiometer 108 of an oscillating gate circuit O. The resistor 106 is connected between the gate 102 and a cathode terminal 110 of the semiconductor switch 100.

The potentiometer or variable resistor 108 is connected at an opposite end from the juncture 104 through a parallel circuit arrangement of a resistor 112 and capacitor 114 of the oscillating gate circuit O to a welding control switch 116. The switch 116 controls the activation of the welding supply circuit 10 to furnish current from the charged capacitors 80 to the stud S through the inductor L.

The resistor 112 and capacitor 114 together with potentiometer 108 form an R-C timing network in the oscillating gate circuit O which controls the time duration of firing of the semiconductor switch 100. The resistance of variable resistor 108 is adjusted according to desired welding operations. The timing of the oscillating gate circuit O is adjusted in connection with controlling the inductance of turnable inductor L, so that only an initial surge of high intensity transient current is furnished to the stud S. This insures a high current flow for formation of a hot contact in the initial arc present when switch 116 is activated. As the resistance of resistor 108 is decreased, the voltage present at the junction 104 and consequently at the gate 102 of the semiconductor switch increases much more rapidly, thereby causing the semiconductor switch 100 to turn on more rapidly when the switch 116 is depressed.

Conversely, when the resistance of resistor 108 is increased, the ability of the voltage presented when the switch 116 to the gate 102 at terminal 104 through the R-C timing network of gate circuit O is depressed increases more slowly, therefore decreasing the time intensity of application of current through the discharge of the capacitor bank 80 through the switch 100 to the inductor L.

Thus, in addition to the tunable inductor L overcoming power flow problems, the oscillating gate circuit O with its R-C timing adjustment permits tuning of the intensity of the current pulses formed during discharge of current to the stud S from the capacitor bank 80 through the semiconductor switch 100 and the tunable inductor L.

Having described the invention above, various modifications of the techniques, procedures, material and equipment will be apparent to those in the art. It is intended that all such variations within the scope and spirit of the appended claims be embraced thereby.

We claim:

1. A capacitive stud welding system having an inductive-capacitive welding current supply circuit comprising:

a stud for attachment by the system to a workpiece, comprising:

a connector head at one end of the stud for fitting into the welding gun of the system;

a collar formed along an intermediate portion of the stud for retaining the label on the workpiece when the stud is attached;

an outwardly extending skirt formed on the stud at an end opposite said connector head, said skirt forming an interior recess for retaining flux of said stud in place against the workpiece as the stud is heated by the welding current; and a tunable inductor for optimizing resonance of the current supply circuit and welding current flow through said stud and the workpiece, said tunable inductor comprising:

a sheet of electrically conductive foil material spirally wound into a layered cylindrical shape and forming a longitudinal passage therethrough along an axis of said layered cylindrical shape;

an insulative laminate mounted within and forming an insulative layer between adjacent layers of said sheet; and a ferromagnetic core movable along said axis within said longitudinal passage of said sheet.

2. In a capacitive stud welding system for attaching a welding stud to a workpiece, the improvement comprising a tunable inductor forming an inductive-capacitive welding current supply circuit in the stud welding system for optimizing resonance of the current supply circuit and welding current flow through the stud and workpiece, said tunable inductor comprising:

a sheet of electrically conductive foil material spirally wound into a layered cylindrical shape and forming a longitudinal passage therethrough along an axis of said layered cylindrical shape;

an insulative laminate mounted within and forming an insulative layer between adjacent layers of said sheet; and a ferromagnetic core movable within said longitudinal passage of said sheet.

3. The inductor of claim 2, wherein said sheet of conductive foil comprises at least in part a material containing copper.

4. The inductor of claim 2, wherein said sheet of conductive foil comprises at least in part a material containing aluminum.

5. The inductor of claim 2, wherein said sheet of conductive foil comprises at least in part a material containing silver.

6. The inductor of claim 2, wherein:
said sheet of electrically conductive material is between about ten and twenty thousandths of an inch thick.

7. The inductor of claim 2, wherein:
said sheet of electrically conductive material is between about four and eight inches in width.

8. The inductor of claim 2, wherein:
said sheet of electrically conductive material is between about ten and twenty feet in length.

9. The inductor of claim 2, wherein:
said insulative laminate is formed from a synthetic resin.

10. The inductor of claim 2, further including:
means for electrically connecting said electrically conductive sheet into the welding current supply circuit.

11. The inductor of claim 10, said electrical connecting means comprises:
a first electrical connector mounted at an inner end of said cylindrical sheet of conductive material; and
a second electrical connector mounted at an outer end of said cylindrical sheet of conductive material.

12. A welding stud for a capacitive stud welding gun system to attach a component to a workpiece comprising:
a connector head at one end of the stud for fitting into the welding gun of the system;
a laterally extending collar formed along an intermediate portion of the stud for retaining the component on the workpiece when the stud is attached;
said collar further serving as a stop when said connector head is fitted into the welding gun of the system;
a longitudinally extending skirt integrally formed on the stud at an end opposite said connector head, said skirt having an outer diameter equal to that of said stud and forming an interior recess for retaining flux of said stud in place against the workpiece as the stud is heated by the welding current.

13. The welding stud of claim 12, wherein said skirt has a substantially flat end surface defining an initial weld area for contact with the workpiece.

14. The welding stud of claim 12, wherein said skirt has an undulating end surface defining an initial weld area for contact with the workpiece.

15. The welding stud of claim 12, wherein said skirt has a notched end surface defining an initial weld area for contact with the workpiece.

16. The welding stud of claim 12, wherein said skirt has a wall thickness formulated to melt on flow of welding current therethrough at a rate corresponding to the rate of filling of said recess with molten body portions from the body of said stud.

17. The welding stud of claim 12, wherein an inner wall surface is formed on said opposite end of said stud within said skirt.

18. The welding stud of claim 17, wherein said inner wall surface is flat.

19. The welding stud of claim 18, wherein said inner wall surface is rounded extending inwardly from said skirt.

20. A stud welding system in which current is discharged into a stud, comprising:
capacitance storage means for storing a charge to be supplied as current into the stud;
rectifier bridge means for charging said capacitance storage means; and
a transformerless power supply circuit for providing voltage-limited alternating current to said rectifier bridge means;
a semiconductor switch for allowing the flow of current from said capacitance storage means into the stud;
a tunable inductor for optimizing resonance with said capacitance storage means for optimal current flow into the stud;
an oscillating gate circuit for tuning the intensity of the current flowing to the stud from said semiconductor switch.

21. The stud welding system of claim 20 wherein said turnable inductor comprises:
a sheet of electrically conductive foil material spirally wound into a layered cylindrical shape and forming a longitudinal passage therethrough along an axis of said layered cylindrical shape;
an insulative laminate mounted within and forming an insulative layer between adjacent layers of said sheet; and
a ferromagnetic core movable within said longitudinal passage of said sheet.

* * * * *